United States Patent
Aenuganti et al.

(10) Patent No.: US 9,171,119 B2
(45) Date of Patent: Oct. 27, 2015

(54) UNIT FILL FOR INTEGRATED CIRCUIT DESIGN FOR MANUFACTURING

(71) Applicant: Oracle International Corporation, Redwood City, CA (US)

(72) Inventors: Nandagoutami Aenuganti, Santa Clara, CA (US); Kuldeep Singh, Santa Clara, CA (US)

(73) Assignee: ORACLE INTERNATIONAL CORPORATION, Redwood City, CA (US)

(*) Notice: Subject to any disclaimer, the term of this patent is extended or adjusted under 35 U.S.C. 154(b) by 0 days.

(21) Appl. No.: 14/156,877

(22) Filed: Jan. 16, 2014

(65) Prior Publication Data

US 2015/0186584 A1 Jul. 2, 2015

Related U.S. Application Data

(60) Provisional application No. 61/923,134, filed on Jan. 2, 2014.

(51) Int. Cl.
*G06F 17/50* (2006.01)

(52) U.S. Cl.
CPC ........ *G06F 17/5072* (2013.01); *G06F 17/5081* (2013.01)

(58) Field of Classification Search
None
See application file for complete search history.

(56) References Cited

U.S. PATENT DOCUMENTS

| 7,363,598 | B2 | 4/2008 | Smith et al. |
| 7,509,622 | B2 | 3/2009 | Sinha et al. |
| 7,565,638 | B2* | 7/2009 | Hoerold ......................... 716/106 |
| 7,681,166 | B2 | 3/2010 | van Adrichem et al. |
| 7,844,936 | B2 | 11/2010 | Melzner |
| 8,001,516 | B2* | 8/2011 | Smith et al. ................... 716/136 |
| 8,332,797 | B2 | 12/2012 | Cheng et al. |
| 2008/0121939 | A1* | 5/2008 | Murray et al. ................. 257/202 |
| 2012/0096419 | A1 | 4/2012 | Mina et al. |

OTHER PUBLICATIONS

Yu Chen, Andrew B. Kahngy, Gabriel Robinsz, and Alexander Zelikovsky, Hierarchical Dummy Fill for Process Uniformity, 6 pages.
Colin Thomas and Ian Smith, Overcoming dummy fill deck limitations for analog design, http://www.techdesignforums.com/practice/technique/dummy-fill-analog, Dec. 3, 2012, 6 pages.

* cited by examiner

*Primary Examiner* — Leigh Garbowski
(74) *Attorney, Agent, or Firm* — Marsh Fischmann & Breyfogle LLP; Daniel J. Sherwinter

(57) ABSTRACT

Embodiments include systems and methods for implementing a dummy fill flow in a processor design that points to a library of fill shapes that are associated with (e.g., defined and supported according to) a particular foundry process. For example, a set of cell types is generated in accordance with a foundry process definition, so that each unit cell type has a unique type identifier and an associated polygon definition. These cell types can be stored as a cell library. An automated fill flow can generate a dummy fill of an integrated circuit geometry with respective shape fills having shape cells that each point to one of the cell types in the cell library. Some implementations can use the cell library to stream in and instantiate the fill in the geometric design of the integrated circuit.

23 Claims, 6 Drawing Sheets

UNIT FILL FOR INTEGRATED CIRCUIT DESIGN FOR MANUFACTURING

FIELD

Embodiments relate generally to integrated circuit design, and, more particularly, to fill techniques to support design for manufacture of integrated circuits.

BACKGROUND

Integrated circuit (IC) design can involve a large number of complex stages, including designing the logical circuit design to perform desired functions and designing the physical layout of the chip to meet performance, manufacturability, and other criteria. For example, design for manufacturability can involve a "fill" process, whereby polygons are added to the physical design to help ensure that the various layers of the chip meet certain density specifications (e.g., metal density, density gradient, etc.) for reliable manufacturability (not for logical functionality). As circuits and chip layouts become more complex and foundry processes support smaller features, the fill process can become increasingly complex.

A number of automated techniques are available for adding fill to the physical layout of an IC. Some such automated fill approaches can fill unused regions of the geometric IC layout with polygons and stream out the result in a predefined, foundry-compliant format (e.g., often the Graphic Data System (GDS) or GDSII format). The fill approaches can attempt to meet defined fill rules, but more simplistic approaches can be ineffective in complex designs and do not tend to account for a potential impact of the fill on other constraints (e.g., the underlying circuit design). Other, more complex fill approaches (e.g., model-based fill approaches) can include integrated, concurrent analysis functions that tend to more fully adhere to a variety of constraints. For example, some smarter fill approaches can produce complex fills with multiple shapes and sizes (e.g., including multi-layer shapes), while minimizing the number of polygons used in the fill by concurrently analyzing metal densities and dynamically adjusting the fill accordingly.

As the fills become more complex, the fill output files tend to increase in size and complexity, with increasing numbers of complicated fill shapes and layouts. Large numbers of fill polygons can interfere with the design process in a number of ways. For example, they can be difficult or inconvenient to maintain in a database, can clutter layout designs, and can be particularly cumbersome in environments where multiple users are working on different blocks of a larger design with hierarchical relationships among the blocks.

BRIEF SUMMARY

Among other things, systems and methods are described for implementing a dummy fill flow in a processor design that points to a library of fill shapes that are associated with (e.g., defined and supported according to) a particular foundry process. For example, a set of cell types is generated in accordance with a foundry process definition, so that each unit cell type has a unique type identifier and an associated polygon definition. These cell types can be stored as a cell library. An automated fill flow can generate a dummy fill of an integrated circuit geometry with respective shape fills having shape cells that each point to one of the cell types in the cell library. Some implementations can use the cell library to stream in and instantiate the fill in the geometric design of the integrated circuit.

According to one set of embodiments, a system is provided for design for manufacturability of an integrated circuit. The system includes a fill definition subsystem and a flow subsystem. The fill definition subsystem operates to: generate a set of cell types in accordance with a foundry process definition, each unit cell type having a unique polygon definition; and store the set of cell types in a cell library associated with the foundry process definition. The fill flow subsystem is communicatively coupled with the fill definition subsystem and operates to fill unused regions of a geometric processor layout with a respective shape fill according to an automated fill optimization, such that each shape fill is defined as a layout of shape cells, each shape cell pointing to one of the cell types in the cell library.

According to another set of embodiments, a computer-implemented method is provided for geometric filling in a processor design. The method includes: generating a set of cell types in accordance with a foundry process definition, each unit cell type having a unique type identifier and an associated polygon definition; storing the set of cell types in a cell library associated with the foundry process definition; and filling a number of unused regions of a geometric processor layout with a respective shape fill according to an automated fill optimization, such that each shape fill is defined as a layout of shape cells, each shape cell pointing to one of the cell types in the cell library.

According to another set of embodiments, a non-transient, computer-readable medium is provided that has instructions stored thereon, which, when executed, cause a processor to perform steps. The steps include: generating a set of cell types in accordance with a foundry process definition, each unit cell type having a unique type identifier and an associated polygon definition; storing the set of cell types in a cell library associated with the foundry process definition; and filling a number of unused regions of a geometric processor layout with a respective shape fill according to an automated fill optimization, such that each shape fill is defined as a layout of shape cells, each shape cell pointing to one of the cell types in the cell library.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
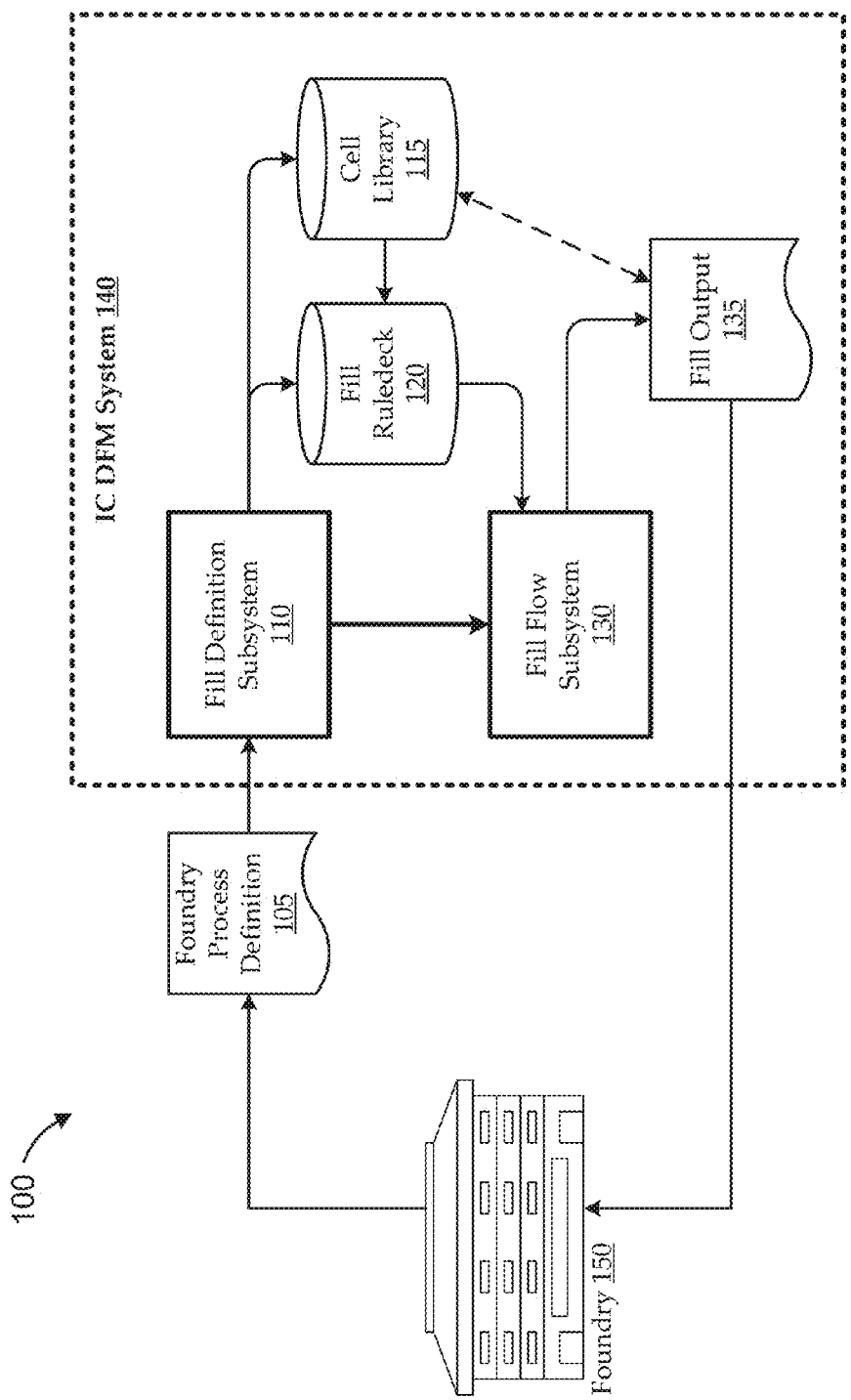
FIG. 1 shows a simplified block diagram of an integrated circuit (IC) design and manufacturing environment, as a context for various embodiments.

FIG. 1 shows a simplified block diagram of an integrated circuit (IC) design and manufacturing environment 100, as a context for various embodiments. The environment 100 includes a foundry 150 that manufactures ICs based on process capabilities of the foundry and on designs and specifications received from a customer. Typically, the designs and/or specifications are received from one or more design functions, such as logical circuit design, physical circuit layout design, etc. For the sake of simplicity, the description focuses on some design functions associated with an IC design for manufacturability (DFM) system 140. The environment 100 is intended only to provide an illustrated context for describing embodiments, and is not intended to limit the scope of embodiments. For example, the foundry 150 can be one or more foundries, and the IC DFM system 140 can be in a single location, distributed among multiple locations and/or entities, part of the foundry 150, etc.

IC design can involve a large number of complex stages, including one or more DFM stages to ensure the manufacturability of the integrated circuit by one or more manufacturing processes. IC DFM typically seeks integration between manufacturing capabilities of a foundry 150 and desired logical functionality of the underlying circuitry. For example, a circuit design often leaves empty areas of some or layers of the physical layout (e.g., the chip or substrate), which can cause manufacturing issues relating to metal densities, density gradients, etc. To mitigate these issues, the IC DFM process can involve "filling" those empty regions with polygons, and the numbers, shapes, sizes, and/or other features of those polygons can vary with manufacturing capabilities and design environment (e.g., software) capabilities. For example, each time a foundry 150 changes its manufacturing capability (e.g., supports smaller feature sizes, etc.), the new capabilities can bring changes in the set of supported fill polygons.

A number of automated techniques are available for adding fill to the physical layout of an IC. Some automated approaches generate a fill according to relatively simple rules, while others generate a fill based on complex models that can dynamically analyze and/or account for densities, density gradients, signal timing, electromagnetic issues, etc. The various automated approaches typically output a geometric layout with the fill in a predefined, foundry-compliant data format (e.g., often the Graphic Data System (GDS) or GDSII format) (illustrated as fill output 135).

The data format and the design software products that generate the data format support increasingly complex geometric definitions. However, as the fills become more complex, the fill output 135 files tend to increase in size and complexity, with increasing numbers of complicated fill shapes and layouts (e.g., including multi-layer shapes). Designing in context of large numbers of fill polygons can often be difficult for a number of reasons. For example, large amounts of fill data can be difficult or inconvenient to maintain in a database, can clutter layout designs, and can be particularly cumbersome in environments where multiple users are iterating designs on different blocks of a larger design with hierarchical relationships among the blocks. For example, modifying a design in one block can cause changes to the fill for that block, which can ripple through an associated hierarchy.

As illustrated, a foundry process definition 105 is communicated from the foundry 150 to the IC DFM system 140. For example, the foundry process definition 105 can include any information that can be used by the IC DFM system 140 to conform its IC design to the manufacturing capabilities of the foundry 150. In some implementations, the foundry process definition 105 identifies a particular IC manufacturing process capability that indicates a set of fill shapes that can be manufactured by that process. Embodiments generate a library of supported fill shapes according to the foundry process definition 105, and generate a set of fill rules for filling unused regions of the IC with cells that point to the library.

Embodiments of the IC DFM system 140 include a fill definition subsystem 110 and a fill flow subsystem 130. In some implementations, the fill definition subsystem 110 can generate a set of cell types in accordance with the received foundry process definition 105. For example, each cell type has a unique polygon definition that can include a shape, size, and/or other any other suitable defining characteristic. The fill definition subsystem 110 can store the set of cell types in a cell library 115. In some implementations, the cell library 115 is associated with a version or other identifier that corresponds to the foundry process definition 105 from which the library was generated. The cell library 115 can be stored in any suitable data store, such as a central database, and the data store can be local to or remote from the fill definition subsystem 110.

Some implementations of the fill definition subsystem 110 can generate and release a fill rule deck 120 associated with the foundry process definition that defines fill criteria and maps each shape cell to a respective one of the cell types in the cell library. Certain fill criteria can relate to metal densities, density gradients, and the like. Other fill criteria can relate to any other suitable criteria, such as timing specifications, electromagnetic concerns, etc. Implementations of the rule deck can include such criteria and can also point the automated process to use the stored cell library 115.

Some embodiments of the fill flow subsystem 130 are in direct or indirect communication with the fill definition subsystem 110 and operate to perform an automated fill flow according to the fill rule deck 120. The automated fill flow can fill a plurality of unused regions of a geometric processor layout with a respective shape fill, such that each shape fill is defined as a layout of shape cells, and each shape cell points to one of the cell types in the cell library 115. In some implementations, each shape fill is defined as a layout of shape cells having respective quantities and placements of instances of corresponding cell types. For example, one shape fill has a first quantity of shape cells of a first cell type and a second quantity of shape cells of a second cell type, and the respective region definition identifies the first quantity of the first cell type and the second quantity of the second cell type.

For the sake of illustration, a typical processor design can include a number of functional circuit blocks. DFM for these blocks can include various complexities, such as different designers working on the different blocks concurrently, and iteratively, the blocks having hierarchical interrelationships, different blocks having different types of electrical and/or manufacturing specifications, etc. Often, the blocks (or portions thereof) are checked in and out by designers to ensure revision control, coordination of updates, and other features.

When a designer modifies a design of a block, the designer can re-run the flow fill to update the geometric layout with fill shapes. Conventionally, running the fill flow generates a large number (e.g., sometimes billions) of fill polygons that are stored in a separate fill database. Accordingly, re-running the fill can involve checking out these large numbers of polygons, updating and/or validating the changes across relevant hierarchies, storing updates back to the fill database, etc. Further, the fill shapes can interfere with other aspects of geometric design, for example, by slowing down design systems, complicating design views, etc.

Figure 2A:
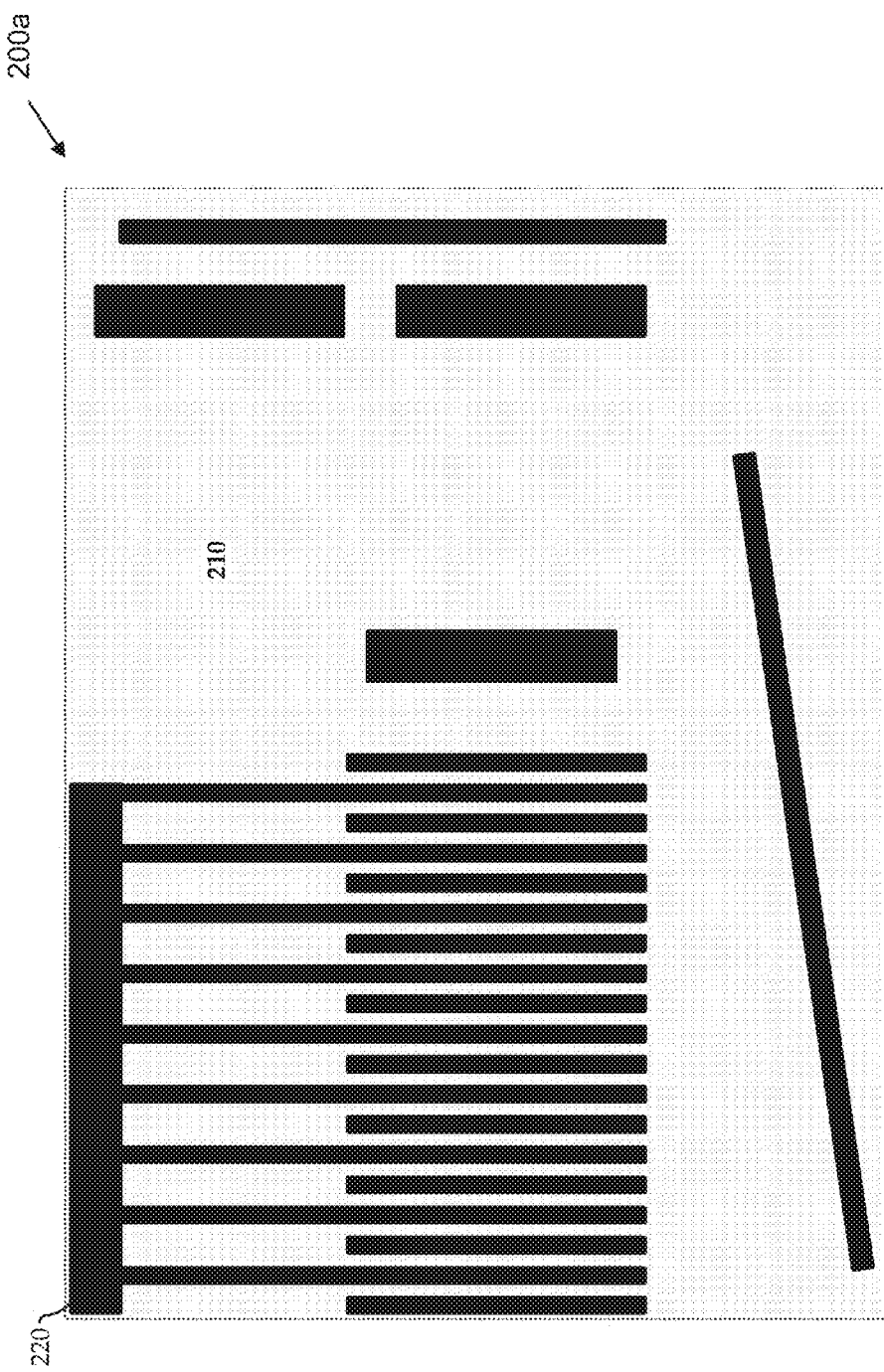
FIGS. 2A and 2B show an illustrative geometric layout of a portion of an integrated circuit before and after running a fill flow, respectively.
Figure 2B:
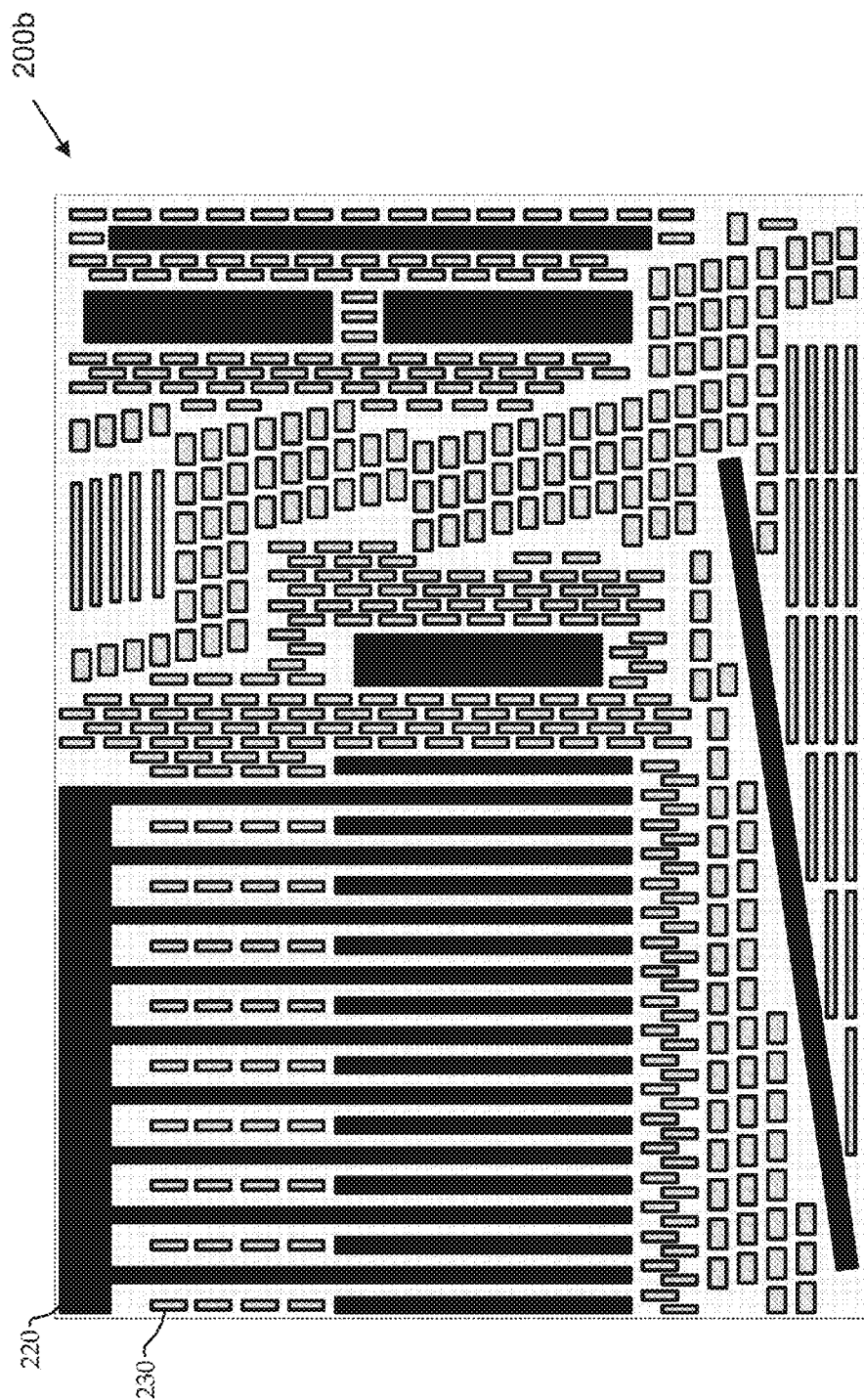

For the sake of added clarity, FIGS. 2A and 2B show an illustrative geometric layout 200 of a portion of an integrated circuit before and after running a fill flow, respectively. The black regions 220 of the layout 200 indicate generic functional circuit elements, such as active or passive circuitry, signal traces, bus bars, etc. The remaining shaded regions (labeled as 210 in FIG. 2A) of the layout 200 are "unused" regions. Unused regions 210 generally refer herein to regions that are not populated with functional components. In some implementations, unused regions 210 can be unused on all or only on some layers of the IC. Further, some regions may lack functional circuitry for a specific functional purpose (e.g., left unused to provide electromagnetic spacing, room for structural hardware, etc.); and various implementations of fill flow may or may not be configured to handle such situations. As described above, and as shown in FIG. 2B, some unused regions of the layout 200 can be filled with a variety of fill shapes 230. Different fill shapes 230 can be used for different purposes, for example, in an attempt to minimize the number of polygons added to the layout for purposes of the fill, to meet metal density and/or other various fill criteria, etc.

Figure 3:
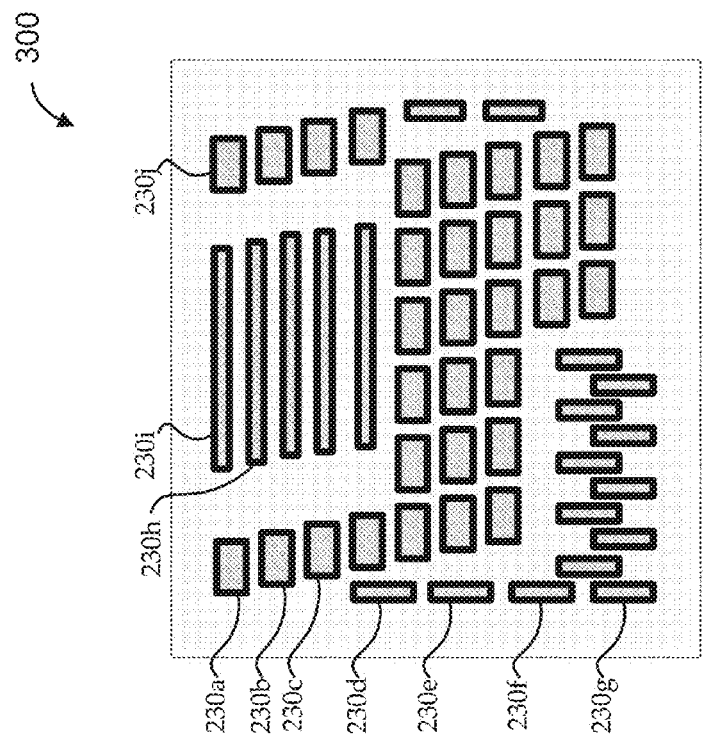
FIG. 3 focuses on a shape fill of the layout of FIG. 2B filled by various fill shapes.

FIG. 3 focuses on a shape fill 300 (e.g., fill region) of the layout of FIG. 2B filled by various fill shapes 230. For example, the shape fill 300 is only a portion of the layout of one layer of one functional circuit block, and it still has more than fifty fill shapes 230. As illustrated, some conventional approaches consider each fill shape 230 as its own unique cell associated with its own identifier, its own geometric definition (e.g., size, shape, location, etc.), etc. These fill shapes 230 can be stored in a fill database. However, large fill databases (particularly coupled with increases in complexity of fill rules) can interfere with efficient and reliable movement between logical and physical design environments (e.g., between logical circuit design and place and route (P&R) environments), delivery of the fill output 135 data to the foundry 150 (e.g., delivery of a tapeout database for mask generation), etc. Some conventional approaches seek to reduce the size and complexity of the fill database by abstracting from individual polygons to cell-based fills (e.g., by defining multi-layer patterns of fill shapes). It is generally desirable to ensure that such approaches are effective for filling different types of unused regions on different layers (e.g., front end of line (FEOL) base layers and back end of line (BEOL) metal layers), while satisfying criteria, such as multi-layer density relationships, multi-layer vias (and "dummy vias"), etc. Still, these approaches typically result in large fill databases that store very large numbers unique polygon definitions.

Rather than storing large numbers of polygons in a separate fill database, embodiments generate the cell library 115 to include a relatively small number (e.g., fifty) of polygon definitions as the entire set of archetypal cell types supported by the associated manufacturing process. According to such embodiments, running the fill flow can generate a fill in such a manner that each fill shape (i.e., each polygon) points to one of the cell types in the cell library 115. For example, each fill shape can effectively be an instance of one of the predetermined archetypal cell types (e.g., rather than each having its own geometry definition or being part of a local hierarchical geometry definition). Using the cell library 115 permits the number of cells to be deterministic. In some implementations, using the cell library 115 allows the generated fill to be streamed into and instantiated in the geometrical IC design with pointers to the cell library 115. For example, a processor design can include hundreds of functional circuit blocks, each being filled with thousands of fill shapes, so that the overall processor design can include hundreds of thousands of fill shapes. Recasting the hundreds of thousands of shapes as instances of only tens of cell types can appreciably improve aspects of the design process, such as ease of database management across various users and designs, speed and reliability of the fill flow, size and usability of the IC design library, size and manageability of the fill output 135 data, etc.

Figure 4:
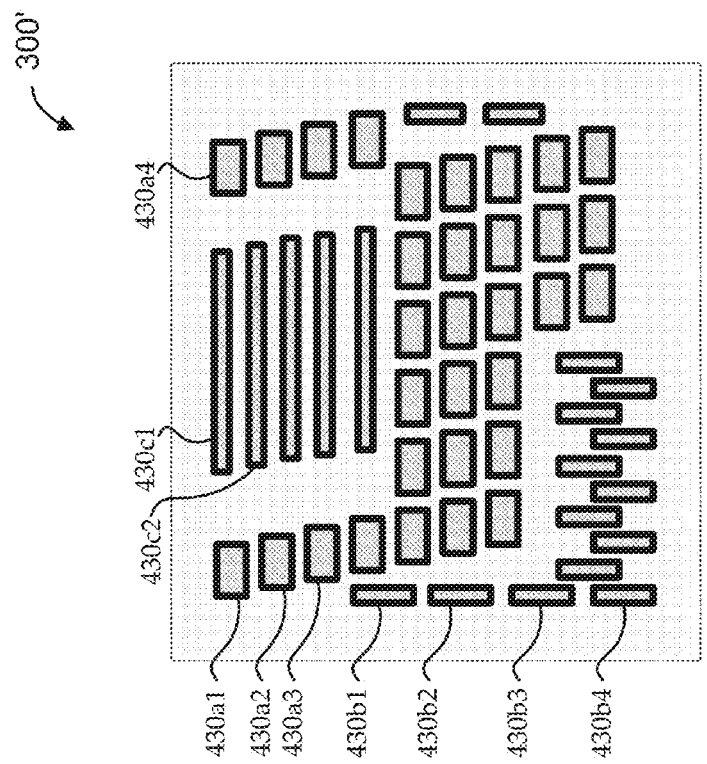
FIG. 4 shows another version of the shape fill of FIG. 3 that illustrates use of a cell library, according to various embodiments.

For example, FIG. 4 shows another version of the shape fill 300 of FIG. 3 (indicated as 300') that illustrates use of a cell library 115, according to various embodiments. As shown, while the shape fill 300' includes over fifty fill shapes 230, the fill shapes 230 can each be described using one of three different cell types (indicated as 430a, 430b, and 430c). For example, the shape fill 300' includes thirty-two instances of the first cell type 430a, fifteen instances of the second cell type 430b, and five instances of the third cell type 430c. Rather than using a separate fill database to manage over fifty polygons when working with this region, the shape fill 300' can be described using pointers to three cell types in a cell library 115.

The various systems described above can be implemented in various ways, including in hardware and/or software, each in a single device, or with functions spread among multiple devices, components, systems, etc. Some implementations can include one or more Application Specific Integrated Circuits (ASICs) adapted to perform a subset of the applicable functions in hardware. Other implementations can have functions performed by one or more other processing units (or cores), on one or more integrated circuits (ICs). In other embodiments, other types of integrated circuits can be used (e.g., Structured/Platform ASICs, Field Programmable Gate Arrays (FPGAs), and other Semi-Custom ICs), which can be programmed. Each can also be implemented, in whole or in part, with instructions embodied in a computer-readable medium, formatted to be executed by one or more general or application specific controllers.

Figure 5:
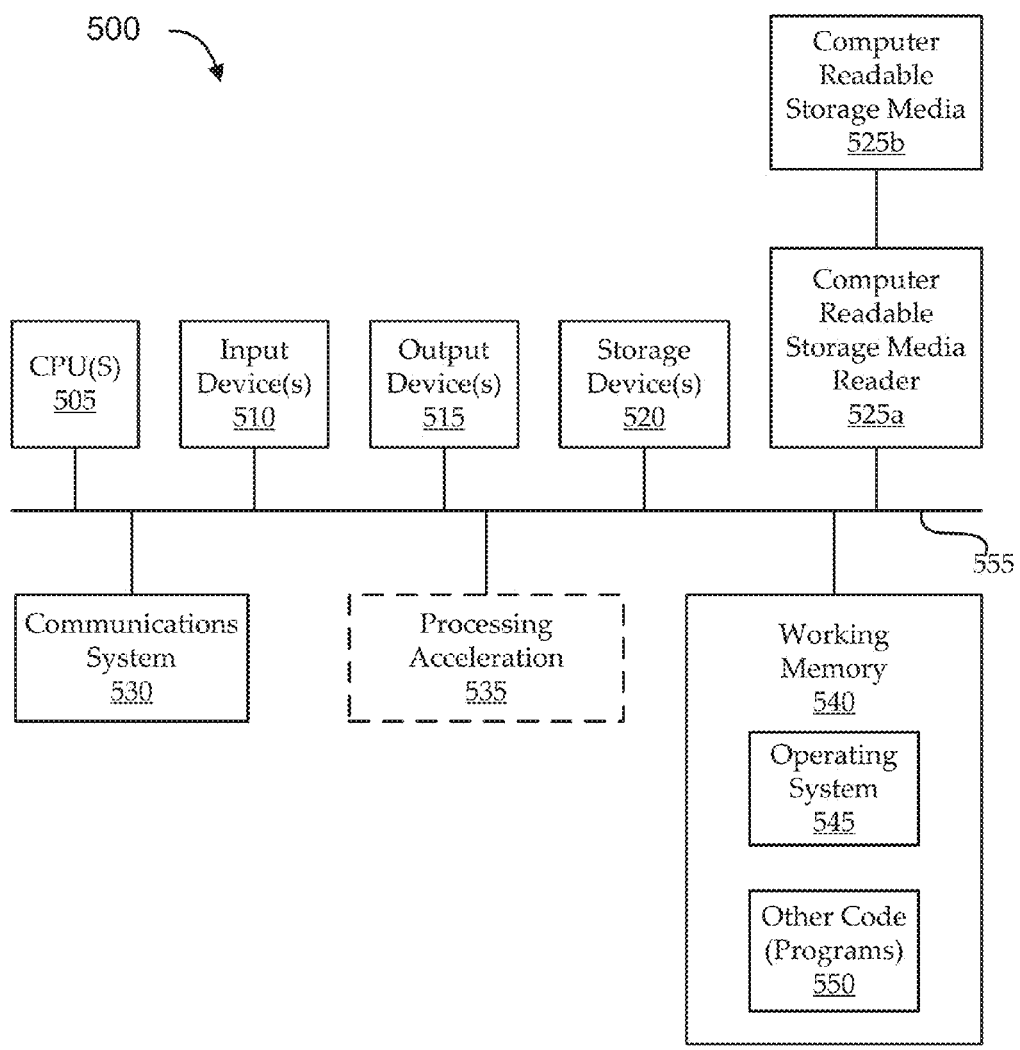
FIG. 5 shows an illustrative computational system for implementing certain functionality of an IC DFM system, according to various embodiments.

FIG. 5 shows an illustrative computational system 500 for implementing certain functionality of an IC DFM system 140, according to various embodiments. The computational system 500 can include or perform functionality of components of fill definition subsystem 110 embodiments and/or fill flow subsystem 130 embodiments, such as those described above. For the sake of simplicity, the computational system 500 is shown including hardware elements that can be electrically coupled via a bus 555. However, embodiments of the computational system 500 can be implemented as or embodied in single or distributed computer systems, in one or more locations, or in any other useful way.

The hardware elements can include a set of (e.g., one or more) central processing units (CPUs) 505, one or more input devices 510 (e.g., a mouse, a keyboard, etc.), and one or more output devices 515 (e.g., a display device, a printer, etc.). The computational system 500 can also include one or more storage devices 520. By way of example, storage device(s) 520 can be disk drives, optical storage devices, solid-state storage device such as a random access memory (RAM) and/or a read-only memory (ROM), which can be programmable, flash-updateable and/or the like. In some embodiments, the storage devices 520 can include or can be in communication with data stores for storing the cell library 115, the fill rule deck 120, the foundry process definition 105, the fill output 135, etc., as described above.

The computational system 500 can additionally include a computer-readable storage media reader 525a, a communications system 530 (e.g., a modem, a network card (wireless or wired), an infra-red communication device, etc.), and working memory 540, which can include RAM and ROM devices as described above. In some embodiments, the computational system 500 can also include a processing acceleration unit 535, which can include a DSP, a special-purpose processor and/or the like. The computer-readable storage media reader 525a can further be connected to a computer-readable storage medium 525b, together (and, optionally, in combination with storage device(s) 520) comprehensively representing remote, local, fixed, and/or removable storage devices plus storage media for temporarily and/or more permanently containing computer-readable information. The communications system 530 can permit data to be exchanged with a network and/or any other computer described above with respect to the computational system 500.

The computational system 500 can also include software elements, shown as being currently located within a working memory 540, including an operating system 545 and/or other code 550, such as an application program (which can be a client application, web browser, mid-tier application, relational database management system (RDBMS), etc.). In some embodiments, one or more functions of the IC DFM system 140 can be implemented as application code 550 in working memory 540. For example, working memory 540 (or any other suitable non-transient memory) can store instructions, which, when executed, can cause the set of processors 505 to perform functions of the fill definition subsystem 110 and/or the fill flow subsystem 130.

Figure 6:
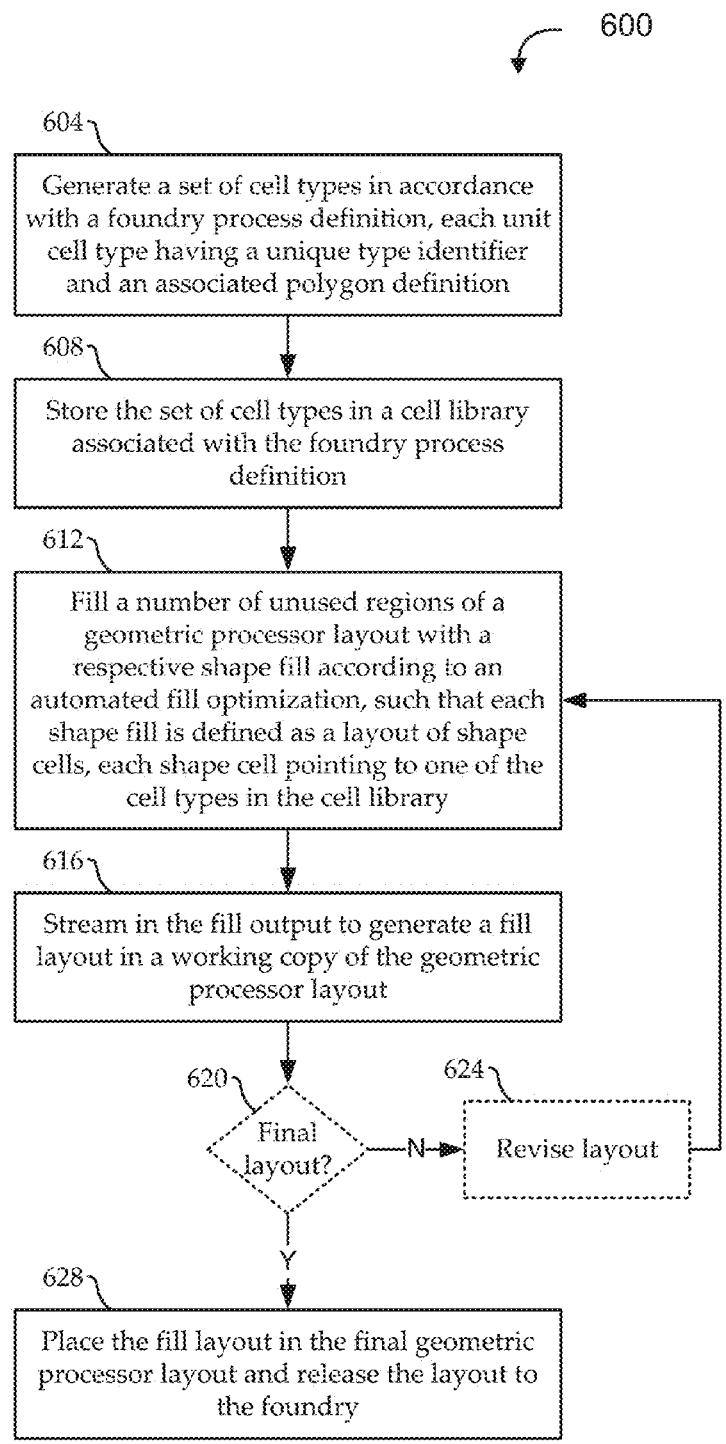
FIG. 6 shows a flow diagram of an illustrative method for geometric filling in a processor design, according to various embodiments.

FIG. 6 shows a flow diagram of an illustrative method 600 for geometric filling in a processor design, according to various embodiments. The method 600 can be performed in any suitable manner, such as by the IC DFM system 140 of FIG. 1, the computational system 500 of FIG. 5, etc. Embodiments of the method 600 begin at stage 604 by generating a set of cell types in accordance with a foundry process definition. Each unit cell type can have a unique type identifier and an associated polygon definition. For example, generating the set of cell types can involve receiving the foundry process definition from a foundry indicating one or more manufacturing process capabilities, and generating the set of cell types in such a way that each cell type is determined to have a shape and size supported by the manufacturing process capability. For example, a particular manufacturing process may support fifty or sixty polygons, each having a particular shape and size, and each cell type corresponds to one of the fifty or sixty polygons. At stage 608, the set of cell types can be stored in a cell library associated with the foundry process definition. For example, the cell library can be stored in a central data store or in any other suitable location.

At stage 612, the method 600 can fill a number of unused regions of a geometric processor layout with a respective shape fill according to an automated fill optimization. The can be performed in such a way that each shape fill is defined as a layout of shape cells, and each shape cell points to one of the cell types in the cell library. For example, each shape fill is defined as the layout of shape cells with respective quantities and placements of instances of corresponding cell types. In some implementations, after generating he cell racy in stage 604, a fill rule deck can be released in association with the particular foundry process definition. The fill rule deck can define fill criteria and can map each shape cell to a respective one of the cell types in the cell library. In such implementations, the filling at stage 612 can be performed according to the fill rule deck.

In some embodiments, the shape fills can be streamed in (e.g., and instantiated in) to the design environment to generate a fill layout in a working copy of the geometric processor layout at stage 616. This can be used iteratively. For example, at stage 620, a determination can be made as to whether the present geometric processor layout represents a final layout. If not, any revisions can be made at stage 624, and the method 600 can iterate the fill flow by returning to stage 612. If the layout design is determined to be final, the final layout can be released with the shape fills in a foundry-compliant data format at stage 628. For example, a fill output file can be released as a GDS file, a tapeout file, etc.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The various operations of methods and functions of certain system components described above may be performed by any suitable means capable of performing the corresponding functions. The means may include various hardware and/or software component(s) and/or module(s), including, but not limited to a circuit, an application specific integrated circuit (ASIC), or processor. For example, logical blocks, modules, and circuits described may be implemented or performed with a general purpose processor, a digital signal processor (DSP), an ASIC, a field programmable gate array signal (FPGA) or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm, or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A system for design for manufacturability of an integrated circuit, the system comprising:
   a fill definition subsystem that operates to:
      generate a set of cell types in accordance with a foundry process definition, each cell type having a unique polygon definition; and
      store the set of cell types in a cell library associated with the foundry process definition; and
   a fill flow subsystem that is communicatively coupled with the fill definition subsystem and operates to fill a plurality of unused regions of a geometric processor layout with a respective shape fill according to an automated fill optimization, such that each shape fill is defined as a layout of shape cells, each shape cell pointing to one of the cell types in the cell library.

2. The system of claim 1, wherein:
   the fill definition subsystem further operates to release a fill rule deck associated with the foundry process definition that defines fill criteria and maps each shape cell to its respective one of the cell types in the cell library; and
   the fill flow subsystem operates to fill according to the fill rule deck.

3. The system of claim 2, wherein at least one of the fill criteria relates to a metal density or a metal density gradient.

4. The system of claim 1, wherein the fill definition subsystem operates to generate by:
   receiving the foundry process definition from a foundry indicating a manufacturing process capability; and
   generating the set of cell types, so that each cell type is determined to have a shape and size supported by the manufacturing process capability.

5. The system of claim 1, wherein each shape fill is defined as the layout of shape cells comprising respective quantities and placements of instances of corresponding cell types.

6. The system of claim 1, wherein:
   one shape fill comprises a first quantity of shape cells of a first cell type,
   the shape fill comprises a second quantity of shape cells of a second cell type, and
   the respective region definition identifies the first quantity of the first cell type and the second quantity of the second cell type.

7. The system of claim 1, wherein the fill definition subsystem is communicatively coupled with a central data store and operates to store the cell library in the central data store.

8. The system of claim 1, wherein the fill flow subsystem operates to fill by:
   streaming in the shape fills to generate a fill layout in a working copy of the geometric processor layout.

9. The system of claim 1, wherein the fill flow subsystem further operates to:
   determine that the geometric processor layout is a final layout;
   stream the shape fills into the final layout; and
   release the final layout with the shape fills in a foundry-compliant data format.

10. The system of claim 1, wherein the geometric processor layout comprises a plurality of circuit blocks, at least some circuit blocks being hierarchically related to others of the circuit blocks.

11. The system of claim 1, wherein:
   the fill definition subsystem comprises non-transient memory having instructions thereon, which, when executed, cause a set of processors to generate the set of cell types and to store the set of cell types; and
   the fill flow subsystem comprises non-transient memory having instructions thereon, which, when executed, cause the set of processors to fill the plurality of unused regions.

12. The system of claim 1, wherein:
   the fill definition subsystem comprises means for generating the set of cell types and means for storing the set of cell types; and
   the fill flow subsystem comprises means for filling the plurality of unused regions.

13. A computer-implemented method for geometric filling in a processor design, the method comprising:
   generating a set of cell types in accordance with a foundry process definition, each unit cell type having a unique type identifier and an associated polygon definition;
   storing the set of cell types in a cell library associated with the foundry process definition; and
   filling a plurality of unused regions of a geometric processor layout with a respective shape fill according to an automated fill optimization, such that each shape fill is defined as a layout of shape cells, each shape cell pointing to one of the cell types in the cell library.

14. The method of claim 13, further comprising:
   releasing a fill rule deck associated with the foundry process definition that defines fill criteria and maps each shape cell to its respective one of the cell types in the cell library,
   wherein the filling is according to the fill rule deck.

15. The method of claim 13, wherein the generating comprises:
   receiving the foundry process definition from a foundry indicating a manufacturing process capability; and generating the set of cell types, so that each cell type is determined to have a shape and size supported by the manufacturing process capability.

16. The method of claim 13, wherein each shape fill is defined as the layout of shape cells comprising respective quantities and placements of instances of corresponding cell types.

17. The method of claim 13, wherein the storing comprises storing the cell library in a central data store.

18. The method of claim 13, wherein the filling comprises:
streaming in the shape fills to generate a fill layout in a working copy of the geometric processor layout.

19. The method of claim 13, further comprising:
determining that the geometric processor layout is a final layout;
streaming the shape fills into the final layout; and
releasing the final layout with the shape fills in a foundry-compliant data format.

20. The method of claim 13, wherein the geometric processor layout comprises a plurality of circuit blocks, at least some circuit blocks being hierarchically related to others of the circuit blocks.

21. A non-transient, computer-readable medium having instructions stored thereon, which, when executed, cause a processor to perform steps comprising:
generating a set of cell types in accordance with a foundry process definition, each unit cell type having a unique type identifier and an associated polygon definition;
storing the set of cell types in a cell library associated with the foundry process definition; and
filling a plurality of unused regions of a geometric processor layout with a respective shape fill according to an automated fill optimization, such that each shape fill is defined as a layout of shape cells, each shape cell pointing to one of the cell types in the cell library.

22. The computer-readable medium of claim 21, wherein the instructions, when executed, cause the processor to perform steps further comprising:
releasing a fill rule deck associated with the foundry process definition that defines fill criteria and maps each shape cell to its respective one of the cell types in the cell library,
wherein the filling is according to the fill rule deck.

23. The computer-readable medium of claim 21, wherein the instructions, when executed, cause the processor to perform steps further comprising:
receiving the foundry process definition from a foundry indicating a manufacturing process capability; and
generating the set of cell types, so that each cell type is determined to have a shape and size supported by the manufacturing process capability.

* * * * *

UNITED STATES PATENT AND TRADEMARK OFFICE
CERTIFICATE OF CORRECTION

PATENT NO.           : 9,171,119 B2
APPLICATION NO.      : 14/156877
DATED                : October 27, 2015
INVENTOR(S)          : Aenuganti et al.

Page 1 of 1

It is certified that error appears in the above-identified patent and that said Letters Patent is hereby corrected as shown below:

In the Specification

In column 2, line 3, delete "flow" and insert -- fill flow --, therefor.

In column 3, line 36, after "or" insert -- all --.

In column 4, line 42, after "automated" insert -- fill --.

In column 4, line 62, delete "concurrently," and insert -- concurrently --, therefor.

In column 7, line 60, delete "The can" and insert -- The fill can --, therefor.

In column 7, line 66, delete "he" and insert -- the --, therefor.

In column 7, line 66, delete "racy" and insert -- library --, therefor.

In the Claims

In column 9, line 41, in claim 1, delete "each cell" and insert -- each unit cell --, therefor.

Signed and Sealed this
Twenty-eighth Day of June, 2016

Michelle K. Lee
*Director of the United States Patent and Trademark Office*